(12) United States Patent
Leavitt et al.

(10) Patent No.: US 7,541,771 B1
(45) Date of Patent: Jun. 2, 2009

(54) RECHARGEABLE BATTERY AND METHOD OF ASSEMBLY

(75) Inventors: Frederick A. Leavitt, San Diego, CA (US); Sam Shifron, San Diego, CA (US); Joseph Zueck, Carlsbad, CA (US)

(73) Assignee: Kyocera Wireless Corp., San Diego, CA (US)

( * ) Notice: Subject to any disclaimer, the term of this patent is extended or adjusted under 35 U.S.C. 154(b) by 409 days.

(21) Appl. No.: 11/370,673

(22) Filed: Mar. 8, 2006

(51) Int. Cl.
*H02J 7/00* (2006.01)
*H01M 2/00* (2006.01)
*H01M 2/08* (2006.01)
*H01M 2/02* (2006.01)

(52) U.S. Cl. .................. 320/112; 320/107; 429/163; 429/175; 429/178

(58) Field of Classification Search ............... 320/107, 320/112; 429/48, 162–163, 175–177, 185, 429/178
See application file for complete search history.

(56) References Cited

U.S. PATENT DOCUMENTS

| | | | |
|---|---|---|---|
| 6,861,821 B2 * | 3/2005 | Masumoto et al. | 320/107 |
| 7,132,196 B2 * | 11/2006 | Morita et al. | 429/178 |
| 7,348,762 B2 * | 3/2008 | Hiratsuka et al. | 320/134 |
| 2003/0170530 A1 | 9/2003 | Nishimura et al. | |
| 2004/0126651 A1 | 7/2004 | Kim et al. | |
| 2005/0208346 A1 | 9/2005 | Moon et al. | |

* cited by examiner

*Primary Examiner*—Akm E Ullah
*Assistant Examiner*—Richard V Muralidar

(57) ABSTRACT

An exemplary battery pack comprises a battery cell having a first terminal and a second terminal disposed on a first end of the battery cell. A support member is attached to the first end of the battery cell, and a first L-shaped contact is connected to the first terminal via a protection circuit module. The protection circuit module is configured to disconnect the first terminal from the L-shaped contact upon a disconnect event. A second L-shaped contact connected to the second terminal, and a top cover encloses the first end of the battery cell, the support member and the protection circuit module. The first and second L-shaped contacts are exposed through corresponding apertures in the top cover, and a label including a body section and first, second, third and fourth flap sections is wrapped around the battery cell such that at least one of the flap sections secures the top cover to the battery cell. A cutout area can be provided on one of the flap sections to expose the L-shaped contacts for interfacing with device or connector contacts.

12 Claims, 3 Drawing Sheets

RECHARGEABLE BATTERY AND METHOD OF ASSEMBLY

FIELD OF THE INVENTION

The present invention relates to the field of mobile power sources. More specifically, the invention relates to compact batteries and methods of assembly thereof.

BACKGROUND OF THE INVENTION

Portable electronic device are supplied power for device operation by a mobile power source, such as a battery. A typical battery pack assembly comprises a battery cell, such as Lithium-ion ("Li-ion") cell for example, having a positive terminal and negative terminal. One or more safety protection devices may be coupled between the terminals and external contacts that interface with the electronic devices to effectively disconnect the battery cell from the device. For example, a positive temperature coefficient ("PTC") device operates as a thermally activated fuse by increasing in resistance when its temperature exceeds a threshold. This high temperature can be caused by high current levels, high ambient temperatures or a cell that is heating due to internal short circuits.

In addition to a PTC, Li-ion cells based on cobalt chemistry typically employ a protection circuit module ("PCM") that actively disconnects the cell from the load under the certain conditions, such as excessive voltage, excessive current, low voltage, excessive temperature, among others.

A challenge in any battery pack assembly design is the need to incorporate safety protection devices in a compact form, particularly in view of increased customer demand for smaller electronic devices. A plastic housing normally encompasses the package and therefore adds extra thickness to the package, typically on the order of several millimeters.

Some battery packs designed to have reduced sizes result in other undesirable shortcomings, such as reduced reliability or increased costs. For example, in a carefully designed pack using thin walled plastics that require expensive injection molding techniques (such as low pressure molding ("LPM") or insert molding) and equipment, this added thickness can be reduced to less than a millimeter, but the associated manufacturing cost is significantly increased. Accordingly, there remains a strong need in the art for a compact mobile power source and method of assembly thereof which addresses one or more of the deficiencies in existing battery pack assemblies.

SUMMARY OF THE INVENTION

An exemplary battery pack comprises a battery cell having a first terminal and a second terminal disposed on a first end of the battery cell. A support member is attached to the first end of the battery cell, and a first L-shaped contact is connected to the first terminal via a protection circuit module. The protection circuit module is configured to disconnect the first terminal from the L-shaped contact upon a disconnect event. A second L-shaped contact connected to the second terminal, and a top cover encloses the first end of the battery cell, the support member and the protection circuit module. The first and second L-shaped contacts are exposed through corresponding apertures in the top cover, and a label including a body section and first, second, third and fourth flap sections is wrapped around the battery cell such that at least one of the flap sections secures the top cover to the battery cell. A cutout area can be provided on one of the flap sections to expose the L-shaped contacts for interfacing with device or connector contacts.

In certain embodiments, a positive temperature coefficient device can be used for connecting the second terminal to the second L-shaped contact and housed within the top cover. In this arrangement, the positive temperature coefficient device is configured to disconnect the second terminal from the second L-shaped contact when a threshold temperature has been exceeded.

According to certain embodiment, a third L-shaped contact is connected to a third terminal of the battery cell, wherein the first, second and third L-shaped contacts are adjacent to each other on the first end of the battery cell. In this arrangement, a first width dimension of the first L-shaped contact is greater than a second width dimension of the second L-shaped contact, and a third width dimension of the third L-shaped contact is greater than the second width dimension of the second L-shaped contact. This particular arrangement allows connectors having different pitches between connector pins to be interfaced with the battery pack assembly.

Other features and advantages of the present invention will become more readily apparent to those of ordinary skill in the art after reviewing the following detailed description and accompanying drawings.

DETAILED DESCRIPTION

Figure 1:
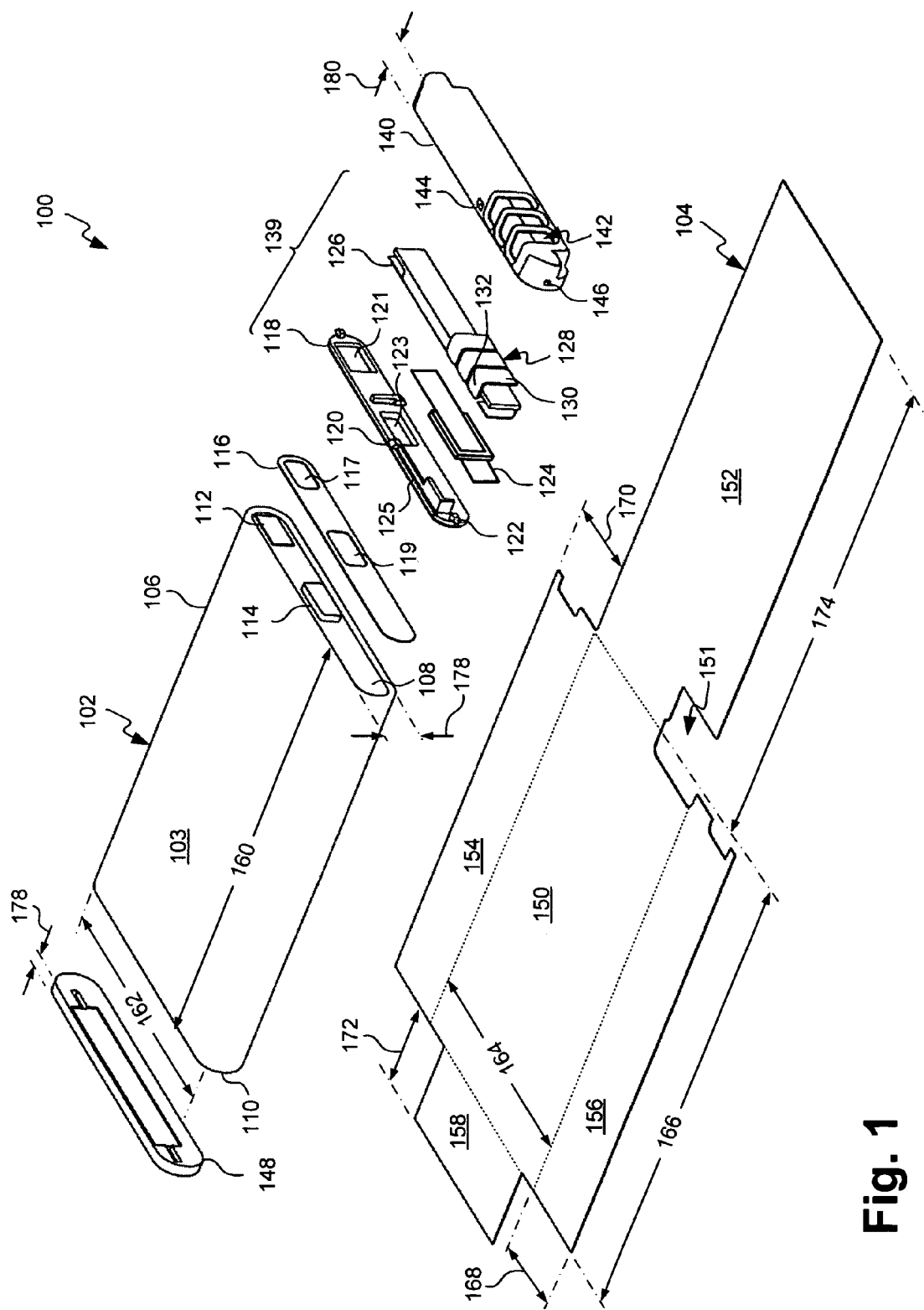
FIG. 1 illustrates an exploded perspective view of an exemplary battery pack assembly according to one embodiment of the present invention.

Referring first to FIG. 1, there is shown an exploded perspective view of exemplary battery pack assembly 100 including battery cell 102 and label 104 according to one embodiment of the present invention. The method for assembling battery pack 100 will be described with reference to the elements of FIG. 1. However, certain details and features have been left out of that will be apparent to a person of ordinary skill in the art having the benefit of this disclosure. For example, a step may consist of one or more sub-steps or may involve specialized equipment or materials, as known in the art. While the following assembly description is sufficient to describe one embodiment of the present invention, other embodiments of the invention may utilize steps and arrangement of elements different from those discussed below in conjunction with FIG. 1.

Battery cell 102 includes a casing 106 and first end 108 and second end 110 opposite first end 108. Battery cell 102 may be a Li-Ion cell and casing 106 may be aluminum, for example. In one embodiment, first and second Nickel/Aluminum ("Ni/Al") clad strips are attached to first end 108 of battery cell 102 to form first terminal 112 and second terminal 114, respectively. For example, the aluminum side of the Ni/Al clad strip is welded to an aluminum cell wall of battery cell 102 exposing the nickel side of the Ni/Al clad strip. Other terminals (not shown) may also be implemented in certain embodiments to provide additional connection with battery components.

Next, support member 118, which is typically is a plastic material, is attached to first end 108 of battery cell 102. As shown in FIG. 1, gasket 116 may be interposed between first end 108 and support member 118 in certain embodiments. For example, gasket 116 may function as an insulator and/or as an adhesive for attaching support member 118 to first end 108 of battery cell 102.

Support member 118 includes a plurality of hooks, e.g., hooks 120 and 122 for securing top cover 140 in a later assembly step. Support member 118 further includes shoulder 125, as will be discussed further below. As shown in FIG. 1, gasket 116 has apertures 117 and 119 and support member 118 has apertures 121 and 123 to expose first and second terminals 112 and 114 through apertures 117, 119, 121 and 123.

At a further assembling step, PTC 124 and PCM 126 are attached to one or more of the terminals 112 and 114 of battery cell 102. For example, PTC 124 may be welded to a negative terminal of the battery cell 102, and PCM 126 may be welded to the positive terminal of battery cell 102.

In the particular embodiment depicted in FIG. 1, a plurality of L-shaped contacts 128 provide connectivity between terminals 112 and 114 and a device (not shown) in which battery pack 100 will be employed. L-shaped contacts 128 may be mounted on PCM 126 as shown in FIG. 1. Each of L-shaped contacts 128 includes a first surface contact area 130 and a second surface contact area 132 approximately perpendicular to the first surface contact area 130. In use, surface contact areas 130 and 132 provide an interface to various electronic devices, and, as described further below in conjunction with FIG. 3, enhance the flexibility of use of battery pack 100. In other embodiments, other contact shapes and configurations may be used with battery pack 100.

PCM 126 operates to disconnect battery cell 102 from the load under the certain conditions, such as excessive voltage, excessive current, low voltage, excessive temperature, among other "disconnecting events", by disconnecting one or more of contacts 128 from one or more of terminals 112 and 114. PTC 124 operates as a thermally activated fuse by increasing in resistance when its temperature exceeds a threshold, effectively disconnecting battery cell 102 from load. As pointed out above, this high temperature can be caused by high current levels, high ambient temperatures or a cell that is heating due to internal short circuits.

Shoulder 125 of support member 118 provides structural support for each of surface contact areas 132 of L-shaped contacts 128 to prevent or otherwise hinder movement and displacement of L-shaped contacts 128 when pressure is applied, e.g., by interface connectors of the device in which battery pack 100 is installed. Support member 118 together with PTC 124, PCM 126 and L-shape contacts 128 are collectively referred to as core pack assembly 139.

At a further assembling step, top cover 140, typically a plastic material, is placed over the core pack assembly 139 to enclose first end 108 of battery cell 102. Apertures 142 of top cover 140 expose L-shaped contacts 128 for interfacing with various devices. Top cover 140 also includes recesses or apertures for receiving the hooks of support member 118. For example, apertures 144 and 146 receive hooks 120 and 122, respectively, for securing top cover 140 to support member 118. Top cover 140 is structured to hold PCM 126 and the remaining core pack assembly 139 components in proper position and to prevent other conductive objects from short-circuiting battery cell 102.

Bottom cover 148 can also be attached to second end 110 of battery cell 102. Like top cover 140, bottom cover 148 provides protection against mechanical damage, e.g., if battery pack 100 is dropped. To ensure a reliable supply of battery packs to support production it is often desirable to be able to purchase battery cells from more than one vendor. Unfortunately the size of battery cells is not standardized and the size of the cells may vary by a few tenths of a millimeter from one vendor to another. By changing the thickness (dimension 178) of bottom cover 148, the difference in length between two different cells can be accommodated, and allow all of the finished battery packs to be the same length.

At a further assembling step, label 104 is wrapped around battery cell 102, top cover 140 and bottom cover 148 to increase the strength of top cover 140 and bottom cover 148. Label 104 includes body section 150 and first flap section 152, second flap section 154, third flap section 156, and fourth flap section 158. An adhesive on one surface area of label 104 holds the label to battery cell 102 when label 104 is wrapped around battery cell 102. The other surface of label 104 may include indicia or other markings, e.g., identification of manufacturer and/or part number.

In the particular embodiment shown in FIG. 1, body section 150 attaches to the bottom surface (opposite top surface 103) of battery cell 102. Dimension 166 of body section 150 is approximately the same as the sum of dimension 160 of battery cell 102, dimension 180 of top cover 140 and dimension 178 of bottom cover 148. Dimension 164 of body section 150 is approximately the same as dimension 162 of battery cell 102. Flap section 154 wraps around one side surface of battery cell 102, and second flap section 156 wraps around the other side surface of battery cell 102. Dimensions 170 and 168 are generally greater than thickness dimension 176 of battery cell 102, such that flap sections 154 and 156 wrap around the side surface of battery cell 102 and partially over top surface 103 of battery cell 102. Flap section 158 has dimension 172 which is generally greater than thickness dimension 176 of battery cell 102, such that flap section 158 wraps around and secures bottom cover 148 and partially over top surface 103 of battery cell 102. Flap section 152 wraps around and secures top cover 140 and at least a portion of top surface 103 of battery cell 102. In the particular embodiment depicted in FIG. 1, flap section 152 further covers a substantial portion of top surface 103, and overlaps a portion of flaps sections 154, 156 and 158. Cutout section 151 of label 104 exposes L-shaped contacts 128 when flap 152 is wrapped around top cover 140.

Figure 2:
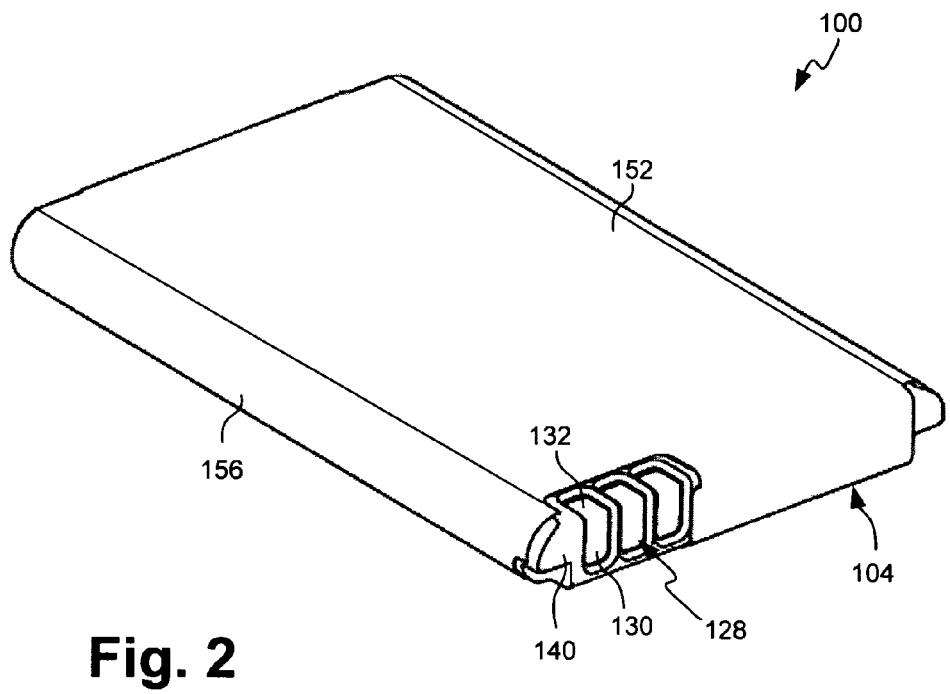
FIG. 2 illustrates a perspective view of an exemplary assembled battery pack according to one embodiment of the present invention.

FIG. 2 depicts a perspective view of battery pack assembly 100 of FIG. 1 after label 104 has been wrapped around battery cell 102. As shown in FIG. 2, flap section 156 is overlapped by flap sections 152 on top surface of battery cell. L-shaped contacts 128 are exposed by cutout area 151 of label 104, and top cover 140 is secured by label 104 to battery cell 102. Since the assembly process of battery pack 100 of FIGS. 1 and 2 do not require expensive insert molding or LPM molding processes, costs of tools, labor and materials for battery pack assembly 100 can be significantly reduced without significantly increasing the final battery pack size, particularly dimension 182. Moreover, electrical and mechanical stability is provided to the battery pack assembly due to the strength provided by core pack 139, cover 140 and label 104 of battery pack 100, as discussed above.

Figure 4:
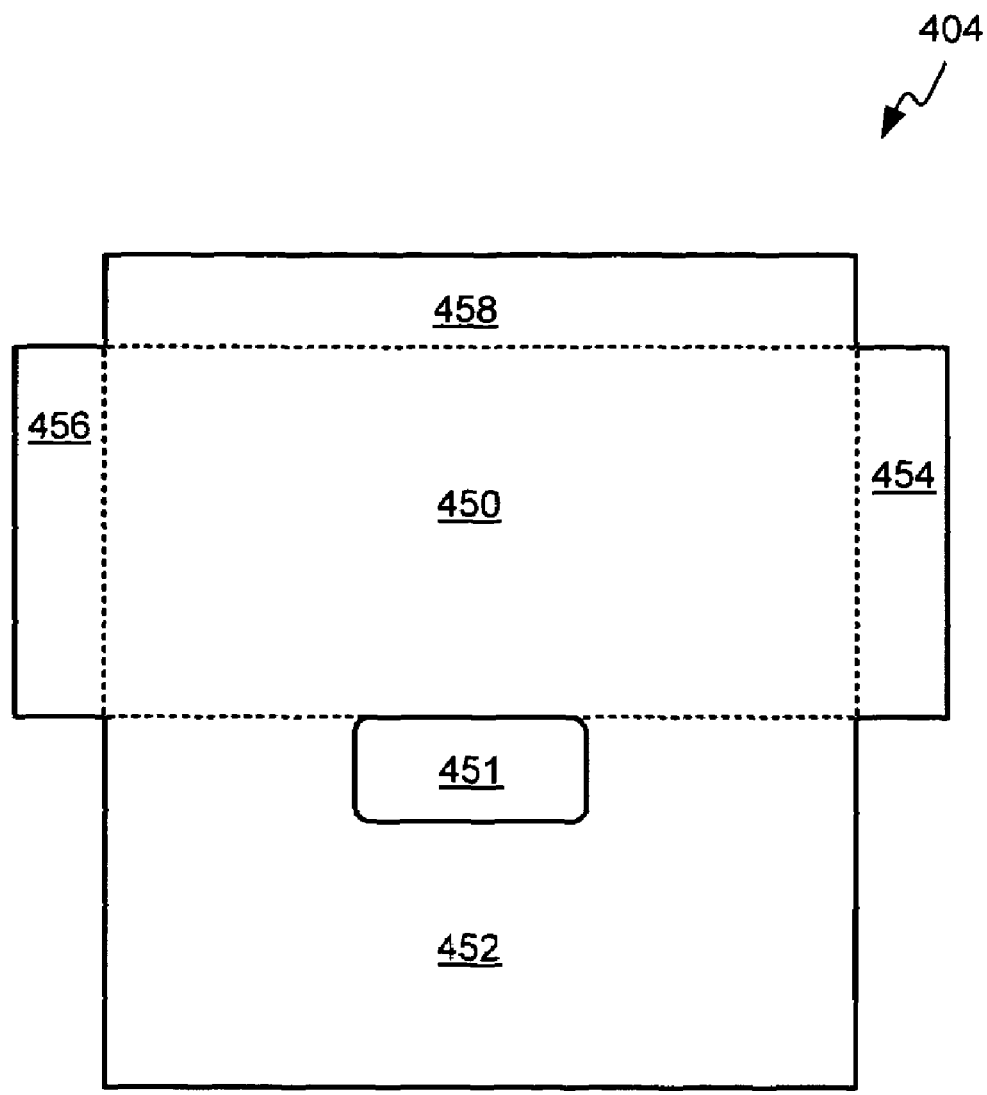
FIG. 4 illustrates an exemplary battery pack label according to one embodiment of the present invention.

FIG. 4 illustrates exemplary label 404 according to another embodiment of the invention. Similar to label 104 of FIG. 1, label 404 includes body section 450 and first flap section 452, second flap section 454, third flap section 456 and fourth flap section 456. Label 404 is suitable for use where dimension 162 is greater than dimension 160 of battery cell 102 in FIG. 1, for example. In the particular embodiment shown in FIG. 4, cutout area 451 has been moved from the edge of flap section 452 to accommodate contacts which are located away from the edge of the battery cell.

Figure 3:
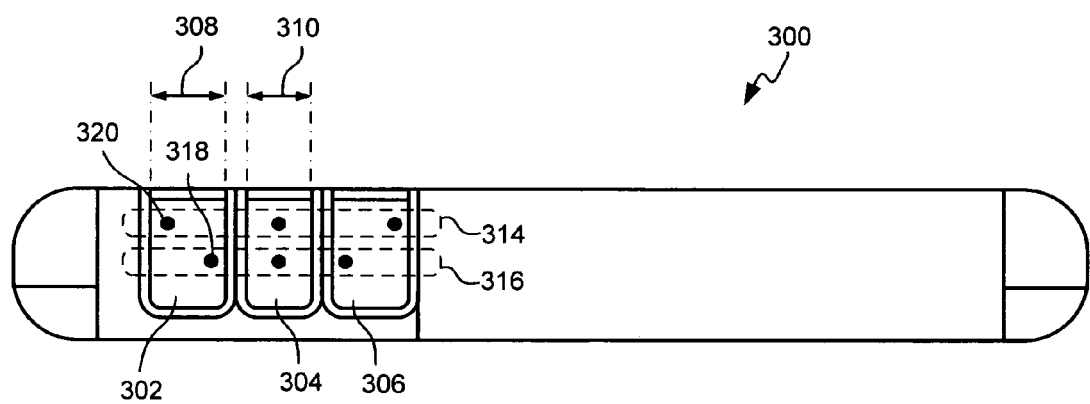
FIG. 3 illustrates an end view of an exemplary assembled battery pack according to one embodiment of the present invention.

Referring now to FIG. 3, there is shown an end view of exemplary battery pack 300 according to an embodiment of the invention. Battery pack 300 can be one embodiment of battery pack 100 discussed above in conjunction with FIGS. 1 and 2.

Battery pack 300 of FIG. 3 is shown including three contacts 302, 304 and 306, which may be L-shaped contacts as discussed above, each connected to a corresponding terminal of the battery cell. Traditionally, the contacts on a battery pack have been designed to have a center-to-center spacing that matches the center-to-center spacing of the connector that is used to contact it. For example, if the contacts on a battery pack are 3 mm from the center of one contact to the center of the adjacent contact it is said to have a 3 mm pitch and can only be used with a connector having a 3 mm pitch.

In contrast, contacts 302, 304 and 306 are structured in order to support connection with a variety of connectors. This arrangement is valuable because when designing any electronic device, such as a mobile phone for example, it is advantageous to be able to use connectors with a range of center to center spacings since it gives the designer greater flexibility to choose from a variety of connectors better enabling the designer to optimize cost, reliability and contact configuration.

In example battery pack 300 depicted in FIG. 3, center contact 304 is structured to have width dimension 310 that is less than the width dimensions of adjacent contacts 302 and 306. Thus, width dimension 310 of contact 302 is less than width dimension 308 of contact 304 in this particular embodiment. If a device connector designed to align with center contact 304 on battery pack 300, contacts 302 and 306 can be structured to range in distance from the edge of the contact nearest center contact 304, e.g., approximately at contact spot 318 to the edge of the contact farthest from center contact 304, e.g., approximately at contact spot 320. In this way, battery pack 100 is able to support a variety of device connectors varying in contact connection widths or pitches. By way of example, both a first connector having a center-to-center contact connection pitch of 3.5 mm (e.g., pitch arrangement 314) and a second connector having a center-to-center contact connection pitch of 2.0 mm (e.g., pitch arrangement 316) could be connected to battery pack 300. In addition to giving the device designer greater freedom in choosing the optimum connector, the flexibility provided by battery pack 300 allows the battery pack to be used on a larger number of devices, allowing the battery pack to be purchased in higher volumes (thereby reducing the purchase price) and eliminating the excess and obsolescence costs associated with left over battery packs when a particular device is no longer in production.

From the above description of exemplary embodiments of the invention, it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. The described exemplary embodiments are to be considered in all respects as illustrative and not restrictive. It should also be understood that the invention is not limited to the particular exemplary embodiments described herein, but is capable of many rearrangements, modifications, and substitutions without departing from the scope of the invention.

What is claimed is:

1. A battery pack comprising:
   a battery cell having a first terminal and a second terminal disposed on a first end of the battery cell;
   a core pack assembly adjacent the first end of the battery cell, wherein the core pack assembly includes,
      a support member attached to the first end of the battery cell and having a first terminal aperture and a second terminal aperture, wherein the support member includes a plurality of hooks and a shoulder,
      a protection circuit module (PCM) adjacent the support member and electrically coupled to the first terminal,
      a positive temperature coefficient (PTC) component adjacent the support member and electrically coupled to the second terminal,
      a first L-shaped contact having a first horizontal surface contact area that is perpendicular to a first vertical surface contact area, wherein the first horizontal surface contact area abuts the support member shoulder, the first L-shaped contact electrically coupled to the first terminal via the protection circuit module, the protection circuit module configured to disconnect the first terminal from the L-shaped contact upon a disconnect event,
      a second L-shaped contact having a second horizontal contact area that is perpendicular to a second vertical surface contact area, wherein the second horizontal surface contact area abuts the support member shoulder, the second L-shaped contact electrically coupled to the second terminal via the PTC;
   a top cover secured to the core pack assembly by the support member hooks, wherein the top cover encloses the support member, the PCM, the PTC, the first L-shaped contact, and the second L-shaped contact, the first vertical surface contact area and the second vertical surface contact area are exposed through corresponding apertures in the top cover; and
   a label including a body section and first, second, third and fourth flap sections, at least one of the flap sections securing the top cover to the battery cell.

2. The battery pack of claim 1, wherein the body section attaches to a bottom surface of the battery cell, the first flap section attaches over the top cover and a top surface of the battery cell, the second flap section attached to a first side surface of the battery cell, the third flap section attached to a second side surface of the battery cell, the fourth flap section attaches over a bottom cover attached to a second end of the battery cell.

3. The battery pack of claim 2, wherein a cutout area of the first flap section exposes the first and second L-shaped contacts.

4. The battery pack of claim 2, wherein the first flap section overlaps a portion of each of the second, third, and fourth flap sections.

5. The battery pack of claim 1, further comprising a third L-shaped contact connected to a third terminal of the battery cell, wherein the first, second and third L-shaped contacts are adjacent to each other on the first end of the battery cell, wherein a first width dimension of the first L-shaped contact is greater than a second width dimension of the second L-shaped contact, and a third width dimension of the third L-shaped contact is greater than the second width dimension of the second L-shaped contact.

6. The battery pack of claim 5, wherein first, second and third L-shaped contacts are configured to receive a first connector having a first pitch spacing associated with first connector pins and a second connector having a second pitch spacing associated with second connector pins, the first pitch spacing greater than the second pitch spacing.

7. A method of assembling a core pack adjacent to a battery cell having a first terminal and a second terminal disposed on a first end of the battery cell, the method comprising:

attaching a support member to the first end of the battery cell, wherein the support member has a first terminal aperture and a second terminal aperture, wherein the support member includes a plurality of hooks and a shoulder;

coupling a protection circuit module (PCM) to the first terminal, wherein the PCM is adjacent to the support member;

coupling a positive temperature coefficient (PTC) to the second terminal, wherein the PTC is adjacent to the support member;

connecting a first L-shaped contact having a first horizontal surface contact area that is perpendicular to a first vertical surface contact area, wherein the first horizontal surface contact area abuts the support member shoulder, the first L-shaped contact electrically coupled to the first terminal via the PCM that is configured to disconnect the first terminal from the L-shaped contact upon a disconnect event;

connecting a second L-shaped contact having a second horizontal contact area that is perpendicular to a second vertical surface contact area, wherein the second horizontal surface contact area abuts the support member shoulder, the second L-shaped contact electrically coupled to the second terminal via the PTC;

securing a core pack assembly that includes the support member, the PCM, the PTC, the first L-shaped contact, and the second L-shaped contact with a top cover that encloses the core assembly, the first vertical surface contact area and the second vertical surface contact are exposed through corresponding apertures in the top cover; and securing the top cover to the battery cell with a label, the label including a body section and first, second, third and fourth flap sections.

8. The method of claim 7, further comprising:

attaching the body section to a bottom surface of the battery cell;

attaching the first flap section over the top cover and a top surface of the battery cell;

attaching the second flap section to a first side surface of the battery cell;

attaching the third flap section to a second side surface of the battery cell;

attaching a bottom cover to a second end of the battery cell;

attaching the fourth flap section over a bottom cover and the second end of the battery cell.

9. The method of claim 8, wherein a cutout area of the first flap section exposes the first and second L-shaped contacts.

10. The method of claim 8, wherein the first flap section overlaps a portion of each of the second, third, and fourth flap sections.

11. The method of claim 7, further comprising connecting a third L-shaped contact to a third terminal of the battery cell, wherein the first, second and third L-shaped contacts are adjacent to each other on the first end of the battery cell, wherein a first width dimension of the first L-shaped contact is greater than a second width dimension of the second L-shaped contact, and a third width dimension of the third L-shaped contact is greater than the second width dimension of the second L-shaped contact.

12. The method of claim 11, wherein first, second and third L-shaped contacts are configured to receive a first connector having a first pitch spacing associated with first connector pins and a second connector having a second pitch spacing associated with second connector pins, the first pitch spacing greater than the second pitch spacing.

\* \* \* \* \*